(12) United States Patent
Kim et al.

(10) Patent No.: US 8,634,391 B2
(45) Date of Patent: Jan. 21, 2014

(54) METHOD FOR COMMUNICATION USING CARRIER SWITCHING IN MOBILE COMMUNICATION SYSTEM SUPPORTING MULTIPLE CARRIER

(75) Inventors: Eunkyung Kim, Seoul (KR); Jae Sun Cha, Daejeon-si (KR); Juhee Kim, Daejeon-si (KR); Soojung Jung, Daejeon-si (KR); Hyun Lee, Daejeon-si (KR); Kwang Jae Lim, Daejeon-si (KR); Chul Sik Yoon, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 581 days.

(21) Appl. No.: 12/870,339

(22) Filed: Aug. 27, 2010

(65) Prior Publication Data

US 2011/0059761 A1   Mar. 10, 2011

(30) Foreign Application Priority Data

Aug. 28, 2009   (KR) .................. 10-2009-0080800
Aug. 27, 2010   (KR) .................. 10-2010-0083292

(51) Int. Cl.
  *H04Q 7/24*   (2006.01)
(52) U.S. Cl.
  USPC ........................... 370/338; 370/432; 370/436
(58) Field of Classification Search
  USPC ................... 370/328–338, 461–463
  See application file for complete search history.

(56) References Cited

U.S. PATENT DOCUMENTS

2008/0165806 A1   7/2008   Reznik et al.
2009/0109890 A1*  4/2009   Chow et al. .................. 370/312
2010/0048225 A1   2/2010   Kwak et al.
2010/0216454 A1*  8/2010   Ishida et al. .................. 455/424

FOREIGN PATENT DOCUMENTS

| EP | 2068580 | 6/2009 | |
| KR | 10-2009-0055599 | 6/2009 | |
| WO | WO 2009/044535 | * 4/2009 | ............... H04Q 7/38 |

OTHER PUBLICATIONS

Aug. 29, 2009 in 'IEEE 802.16 Broadband Wireless Access Working Group' under the title of "E-MBS Support in IEEE 802.16m (E-MBS)".

(Continued)

*Primary Examiner* — Pao Sinkantarakorn
(74) *Attorney, Agent, or Firm* — Staas & Halsey LLP

(57) ABSTRACT

There is provided a method for transmitting data by a base station (BS) in a multicast broadcast service (MBS) supporting multiple carriers in a wireless communication system. The method comprises receiving a switching request message indicating an E-MBS service requested by a mobile station (MS), from the MS, transmitting a switching response message including information regarding a switching start time among a plurality of carriers set in the MS and transmitting data regarding an E-MBS service requested by the MS to the MS through a primary carrier, starting from the switching start time.

Alternatively, there is provided a method for receiving data by a mobile station (MS) in a multicast broadcast service (MBS) supporting multiple carriers in a wireless communication system. The method comprises transmitting a switching request message indicating an E-MBS service requested by the MS to a BS, receiving a switching response message including information regarding a switching start time among a plurality of carriers set in the MS from the BS, switching from a secondary carrier to a primary carrier at the switching start time and receiving data regarding an E-MBS service requested by the MS from the BS through the primary carrier.

13 Claims, 10 Drawing Sheets

(56) References Cited

OTHER PUBLICATIONS

Nov. 6, 2009 in 'IEEE 802.16 Broadband Wireless Access Working Group under the title of "Dedicated Carrier Supporting E-MBS in IEEE 802.16m".

Mar. 5, 2010 in 'IEEE 802.16 Broadband Wireless Access Working Group under the title of "Proposed Text on the E-MBS Operation in Alternative Carrier in IEEE P802.16m (16.9.2)".

Apr. 30, 2010 in 'IEEE 802.16 Broadband Wireless Access Working Group under the title of "Proposed Text on the E-MBS Operation Supporting Carrier Switch Mode in IEEE P802.16m (16.9.2)".

Jul. 9, 2010 in 'IEEE 802.16 Broadband Wireless Access Working Group' under the title of "E-MBS Operation on Multicarrier Deployment in IEEE P802.16m (16.9.2)".

\* cited by examiner

METHOD FOR COMMUNICATION USING CARRIER SWITCHING IN MOBILE COMMUNICATION SYSTEM SUPPORTING MULTIPLE CARRIER

CROSS-REFERENCE TO RELATED APPLICATIONS

This application claims the benefit of priority of Korean Patent Application No. 10-2009-0080800 filed on Aug. 28, 2009 and Korean Patent Application No. 10-2010-0083292 filed on Aug. 27, 2010, which are incorporated by reference in their entirety herein.

BACKGROUND OF THE INVENTION

1. Field of the Invention

The present invention relates to a wireless communication system supporting multiple carriers between a mobile station and a base station and, more particularly, to a communication method using carrier switching with respect to a mobile station which cannot simultaneously process multiple carriers.

2. Description of the Related Art

3GPP (3rd Generation Partnership Project) LTE (long term evolution) and IEEE (Institute of Electrical and Electronics Engineers) 802.16m is being developed as a candidate of a next-generation wireless communication system. The 802.16m standard involves two aspects of continuity of the past of modification of the existing 802.16e standard and continuity of the future of a standard for a next-generation IMT-Advanced system. Thus, the 802.16m standard is required to meet advanced requirements for the IMT-Advanced system while maintaining compatibility with the 802.16e standard-based mobile WiMAX while maintaining compatibility with the 802.16e standard-based mobile WiMAX system.

In general, a wireless communication system uses one bandwidth for a data transmission. For example, a $2^{nd}$-generation wireless communication system uses a bandwidth of 200 KHz to 1.25 MHz, and a $3^{rd}$-generation wireless communication system uses a bandwidth of 5 MHz to 10 MHz. In order to support an increasing transmission capacity, the recent 3GPP LTE or 802.16m extends the bandwidth to 20 MHz or higher. The extension of the bandwidth to increase the transmission capacity seems inevitable, but the support of a wide bandwidth even for a case in which a required service level is low causes unnecessary power consumption.

Thus, a multi-carrier system allowing for a transmission and/ore reception of data at a broadband through a plurality of carriers by defining a carrier having one bandwidth and a center frequency has been emerged. The multi-carrier system supports both a narrowband and a broadband by using one or more carriers. For example, when one carrier corresponds to a 5 MHz bandwidth, the multi-carrier system supports a maximum 20 MHz bandwidth by using four carriers.

The IEEE 802.16m system supports an enhanced multicast broadcast service (E-MBS). The E-MBS is a point-to-multipoint system in which data packets are simultaneously transmitted from one source to a plurality of destinations. Broadcasting refers to the capability of transmitting contents to every user. Multicasting refers to contents destined for a particular group of users subscribed to receive a particular service. Static multicasting and dynamic multicasting may be supported.

In the multi-carrier system, namely, in the system in which a plurality of uplink carriers and a plurality of downlink carriers are in use, when a mobile station cannot process the plurality of carriers, an effective switching method is required to smoothly provide an E-MBS service.

SUMMARY OF THE INVENTION

Therefore, an object of the present invention is to provide a method for transmitting data by using carrier switching in a wireless communication system supporting multiple carriers.

In one aspect of the present invention, there is provided a method for transmitting data by a base station (BS) in a multicast broadcast service (MBS) supporting multiple carriers in a wireless communication system, which comprises receiving a switching request message indicating an E-MBS service requested by a mobile station (MS), from the MS, transmitting a switching response message including information regarding a switching start time among a plurality of carriers is set in the MS and transmitting data regarding an E-MBS service requested by the MS to the MS through a primary carrier, starting from the switching start time.

In another aspect of the present invention, there is provided a method for receiving data by a mobile station (MS) in a multicast broadcast service (MBS) supporting multiple carriers in a wireless communication system which comprises transmitting a switching request message indicating an E-MBS service requested by the MS to a BS, receiving a switching response message including information regarding a switching start time among a plurality of carriers set in the MS from the BS, switching from a secondary carrier to a primary carrier at the switching start time and receiving data regarding an E-MBS service requested by the MS from the BS through the primary carrier.

For an E-MBS service supporting multi-carrier operation, different carriers are switched to provide data and service without delay or interruption.

DETAILED DESCRIPTION OF THE INVENTION

Figure 1:
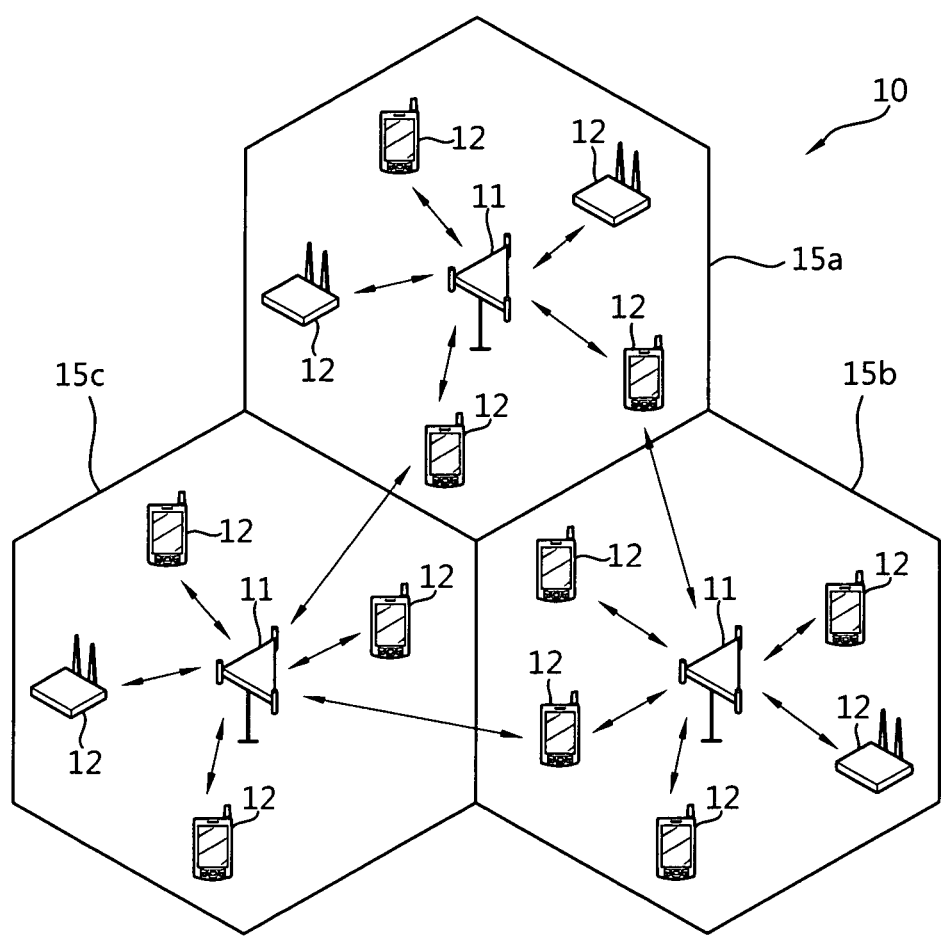
FIG. 1 illustrates a wireless communication system.

FIG. 1 illustrates a wireless communication system. The wireless communication system 10 includes at least one base station (BS) 11. Each BS 11 provides a communication service to particular geographical areas (which is generally called cells) 15a, 15b, and 15c. The cells may be divided into a plurality of areas (which is generally called sectors). A mobile station (MS) 12 may be fixed or mobile and may be referred to by other names such as user equipment (UE), mobile terminal (MT), user terminal (UT), subscriber station (SS), wireless device, personal digital assistant (PDA), wireless modem, handheld device, etc. The BS 11 generally refers to a fixed station that communicates with the MS 12 and may be called by other names such as evolved-node B (eNB), base transceiver system (BTS), access point (AP), etc. Hereinbelow, downlink (DL) refers to communication from the BS 11 to the MS 12, and uplink (UL) refers to communication from the MS 12 to the BS 11. In the downlink, a transmitter may be a part of the BS 11 and a receiver may be a part of the MS 12. In the uplink, a transmitter may be a part of the MS 12 and a receiver may be a part of the BS 11. Sizes (i.e., bandwidths) of multiple carriers may vary. For example, when five carriers are used to configure a 70 MHz band, the five carriers may be configured as follows: 5 MHz carrier (carrier #0)+20 MHz carrier (carrier #1)+20 MHz carrier (carrier #2)+20 MHz carrier (carrier #3)+5 MHz carrier (carrier #4).

A multi-carrier system (MCS) refers to a system supporting multiple carriers on the basis of a spectrum aggregation.

Figure 2:
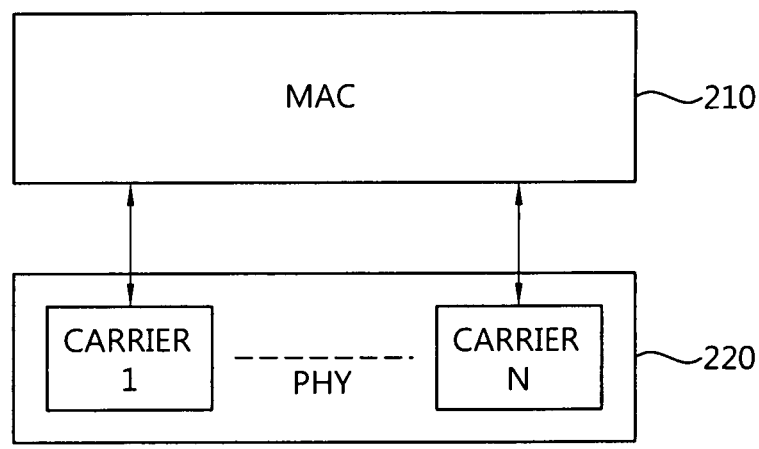
FIG. 2 shows an example of a protocol structure for supporting multiple carriers.

FIG. 2 shows an example of a protocol structure for supporting multiple carriers. A common medium access control (MAC) entity 210 manages a physical (PHY) layer 220 using a plurality of carriers. A MAC management message transmitted to a particular carrier may be applied to a different carrier. The PHY layer 220 may operate according to TDD (Time Division Duplex) and/or FDD (Frequency Division Duplex).

Figure 3:
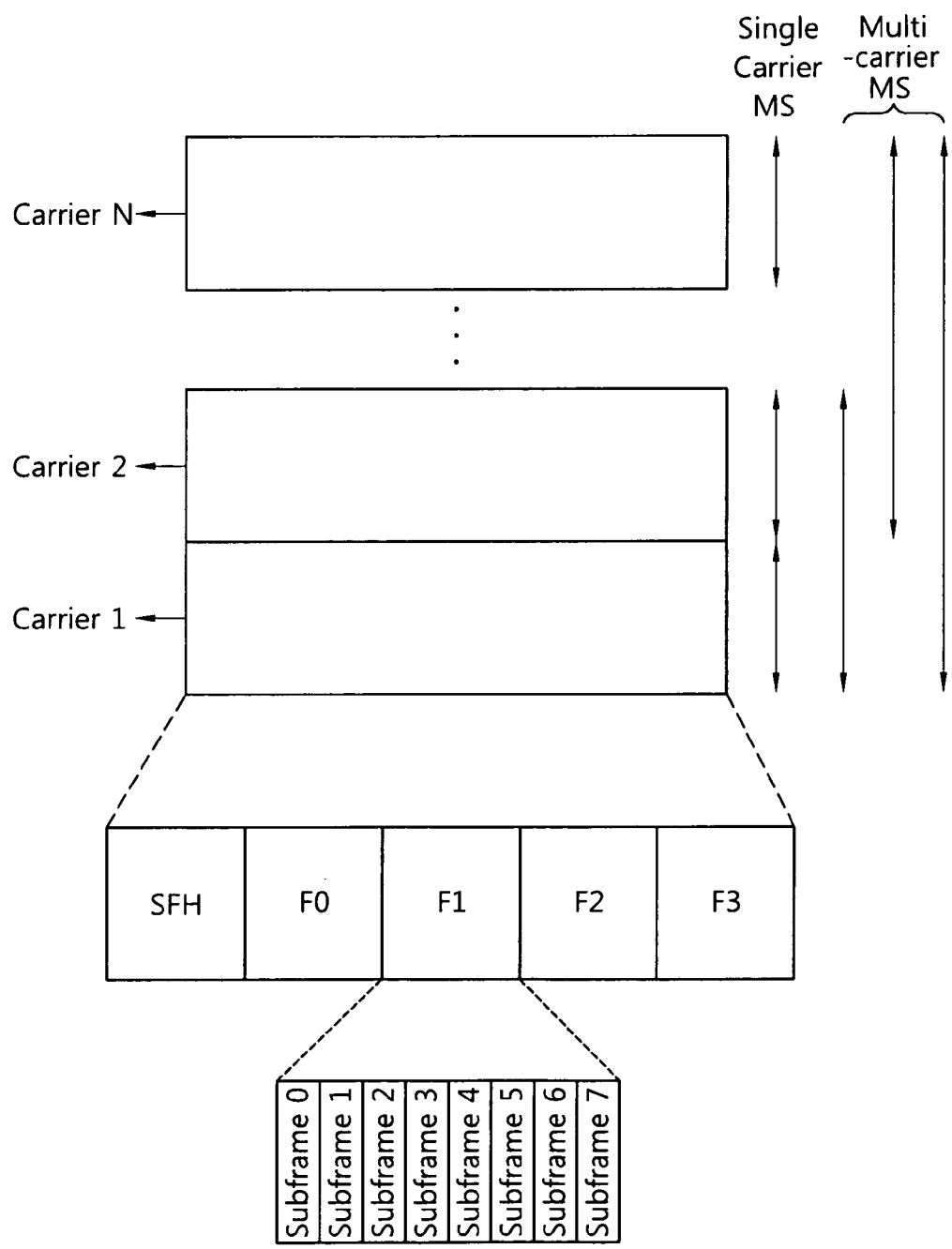
FIG. 3 illustrates an example of a frame structure for operating multiple carriers.

FIG. 3 illustrates an example of a frame structure for operating multiple carriers. A superframe includes four radio frames (F0, F2, F3, F3), and each of the radio frames includes eight subframes. A subframe includes a plurality of OFDM symbols. A superframe header (SFH) is positioned at a first subframe within the superframe. The SFH, which refers to a unit of transmission of several frames, largely includes essential system parameters and system configuration information and is transmitted to the MS. The SFH is divided into a primary SFH (P-SFH) and a secondary SFH (S-SFH). The P-SFH is largely transmitted by superframe. The P-SFH defines whether or not the S-SFH is transmitted and changed, and is transmitted in units of one or more superframes. Each carrier may have its own SFH. The SFH is transmitted via a broadcast channel and carries essential is system parameters. Some carriers may have only a portion of the SFH. Multiple carriers may be adjacent to each other or may not. The MS may support one or more carriers according to its capability.

Carriers may be divided into a fully configured carrier and a partially configured carrier depending on directionality. The fully configured carrier is a bi-directional carrier allowing for a transmission and/or reception of every control signal (synchronization, broadcast, multicast, unicast control signals) and data, which can be applicable to both a single carrier MS and a multi-carrier MS. The partially configured carrier is a uni-directional carrier allowing for a transmission of only downlink data. In a TDD scheme, the partially configured carrier refers to a downlink carrier, and in an FDD scheme, the partially configured carrier refers to a downlink carrier not paired with an uplink carrier. The partially configured carrier may be largely used for a multicast broadcast service (MBS) and/or a single frequency network (SFN) but the MS cannot enter a network or perform handover with the partially configured carrier.

Carriers may be divided into a primary carrier and a secondary carrier depending on whether or not they are activated. The primary carrier is a constantly activated carrier, which transmits traffic and PHY/MAC control signal between the BS and the MS. Although the BS supports multiple carriers, if the ME serving by the BS is in a single carrier mode, communication is performed only by one carrier. The secondary carrier Is a carrier which is activated or deactivated according to particular conditions, which is a supplementary carrier of the primary carrier. The secondary carrier is used to transmit traffic, or it is a carrier to which a special command or rule instructed by the primary carrier is applied. Here, activation refers to a state in which traffic data is transmitted or is received or a ready state for transmission or reception of traffic data. Deactivation refers to a state in which traffic data cannot be transmitted or received and measurement or transmission or reception of minimum information is available.

Radio resource is performed through the primary carrier and one or more secondary carriers in a single common MAC of the multi-carrier system. However, full controlling such as MS's mobility, state, context, and the like, is performed only through the primary carrier.

The MS may use only one primary carrier or one or more secondary carriers along with a primary carrier. The MS may be allocated the primary carrier and/or the secondary carrier from the BS. The primary carrier may be a fully configured carrier, through which major control information is exchanged between the BS and the MS. The secondary carrier may be a fully configured carrier or a partially configured carrier, which is allocated according to a request of the MS or an instruction of the BS.

The primary carrier may be used for a network entry of the MS and/or an allocation of the secondary carrier. The primary carrier is not a fixed carrier but may be selected from among fully configured carriers. A carrier set as the secondary carrier may be changed to the primary carrier.

Carrier switching will now be described.

In a wireless communication system supporting multiple carriers, a corresponding physical layer connection of the MS may be switched from a primary carrier to a secondary carrier or from the secondary carrier to the primary carrier according to an instruction of the BS. This is called carrier switching. In particular, carrier switching frequently takes place when the secondary carrier is a is partially configured carrier. When the MS is connected to the secondary carrier for a certain period of time, the MS does not need to continue the physical layer connection with the primary carrier.

Carrier switching may be performed by a MAC management message transmitted through the primary carrier periodically or in an event-triggered manner. When the MS switches to the secondary carrier, the primary carrier of the MS provides basic information such as a timing for synchronization with the secondary carrier, a frequency adjustment, and the like to the MS.

The MAC management message transmitted by the MS to switch the carrier includes various information transmitted through a carrier, and the information includes a target partially configured carrier, a switching mode, a switching start time, a switching interval, a switching period, and the like.

The switching mode refers to one of a periodic switching mode and an event-triggered switching mode. The switching start time refers to a point in time at which the MS switches from one carrier to another carrier. The switching start time may be represented by a superframe number. The switching interval refers to a time during which the MS stays at the carrier after switching. For example, when the MS switches from the primary carrier to the secondary carrier, the switching interval refers to a time during which the MS stays at the secondary carrier. The switching period may be used for the periodical type switching, which refers to a time from a previous switching start time to a next switching start time. The switching interval or the switching period may be represented by a superframe unit.

When the MS switches from the primary carrier to the secondary carrier, after the switching interval has passed, the MS may switch back from the secondary carrier to the primary carrier. This is called a reverse switching. Conversely, when the MS switches from the secondary carrier to the primary carrier, switching from the primary carrier to the secondary carrier after the switching interval has passed is a reverse switching.

When an E-MBS service is provided in the multi-carrier system, an interval having a certain pattern during which several frames are simultaneously transmitted is called an MBS scheduling interval (MSI). At least one control channel exists in the MSI interval, and a superframe header mainly indicates the position and area of the control channel to be searched by the user. The control channel may include an MBS MAP. The MBS MAP indicates an area where an MBS data burst is positioned.

In the E-MBS service of the general multi-carrier system, carrier switching is made as the BS indicates a corresponding switching start time, a switching interval, a switching period, and the like, to the MS. In this case, however, switching needs to be performed more minutely and effectively in consideration of a data transmission for uplink of the MS and the E-MBS service.

Hereinafter, switching from a primary carrier to a secondary carrier will be described. In case of the E-MBS, BS simultaneously transmits data to a plurality of MSs unilaterally, so, in many cases, a service is provided through a carrier as a partially configured carrier supporting downlink and secondary carrier. In case of the secondary carrier, uplink transmission from the MS to the BS cannot be made, so carrier switching from the secondary carrier to the primary carrier may be required. However, the scope of the present invention is not limited thereto.

The BS may calculate a switching start time and inform the MS through a DSA process. However, although the BS has calculated a switching start time but failed to find an available time, it may receive a corresponding request. Even before switching to the primary carrier, namely, even while data is transmitted by the secondary carrier, the BS may receive a request for a switching start time from the MS. In this case, the BS may perform monitoring by opening an uplink control channel for receiving a signal from the MS. The uplink control channel may exist in the primary carrier or in the secondary carrier.

Figure 4:
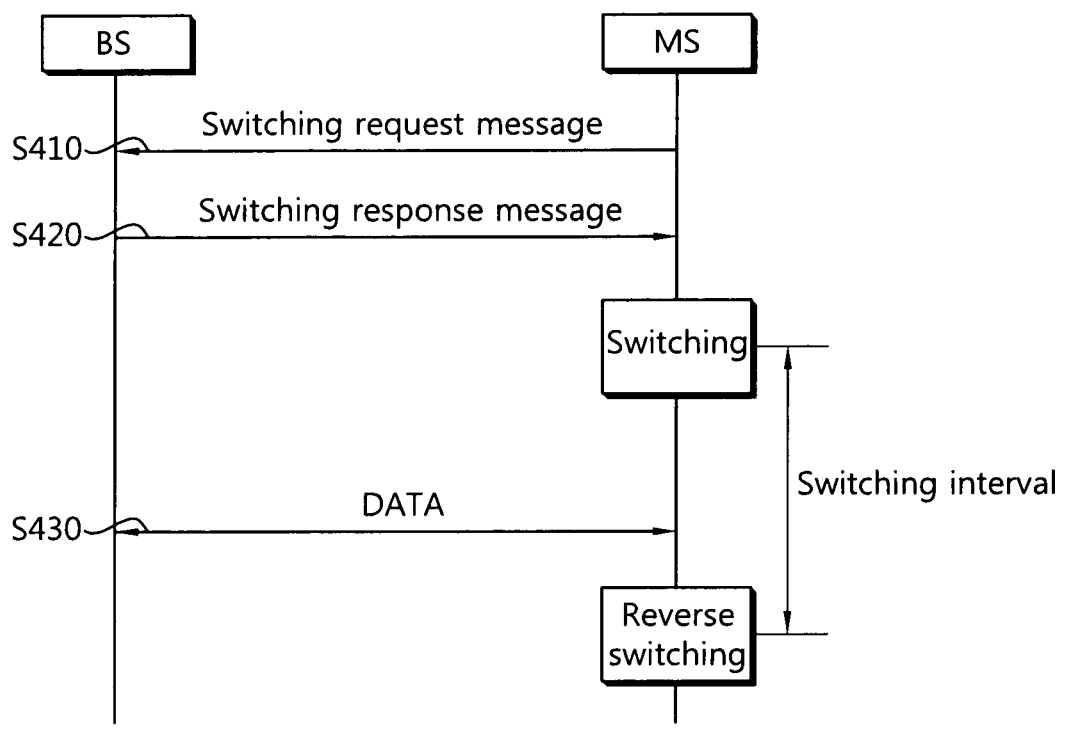
FIG. 4 is a flow chart illustrating a carrier switching process according to an exemplary embodiment of the present invention.

FIG. 4 is a flow chart illustrating a carrier switching process according to an exemplary embodiment of the present invention.

With reference to FIG. 4, the MS transmits a switching request message indicating an E-MBS service desired or requested by the MS to the BS (S410). The BS transmits a switching response message including information regarding a switching start time among a plurality of carriers set in the MS to the MS (S420). The MS switches from the secondary carrier to the primary carrier at the switching start time with reference to the switching response message and then receives data from the BS through the primary carrier, starting from the switching start time (S430). After the switching interval, the MS may switch back to the secondary carrier from the primary carrier.

When the carrier switching is performed (for example, when a carrier switching mode is 0b1), the MS may inform the BS about an E-MBS service (or content) desired by the MS through the switching request message. For example, the switching request message may be an E-MBS notification message (E-MBS-REP message). After the switching request message is received, the BS calculates an interval allowing the MS to perform unicast scheduling in the primary carrier, and in this case, the BS may use an E-MBS connection bitmap of the switching request message. The BS schedules a unicast service of the MS through the primary carrier on the basis of an available interval calculated by using the E-MBS connection bitmap of the switching request message. When the MS changes the concurrently received E-MBS service, the MS transmits the switching request message including an updated E-MBS connection bitmap.

The switching request message is transmitted from the MS to the BS when one of the following conditions is met.

1. When the MS requests a start time for switching to an E-MBS carrier after DSA, DSC, or DSD transaction from the BS.

2. When the MS updates an indication regarding a currently received E-MBS stream without releasing an E-MBS connection allocated through a DSA-REQ or DSA-RSP message.

3. When the MS indicates a time at which E-MBS carrier switching is to be stopped without releasing the E-MBS connection allocated through a DSA-REQ or DSA-RSP message.

The switching request message may be transmitted through at least one of ranging, subheader, an existing MAC management message, a new MAC management message, and a control channel.

The following table shows an example of the switching request message.

| Attributes/Array of attributes | Size (bits) | Value/Notes | Conditions |
|---|---|---|---|
| MAC Control Message Type | 8 | AAI E-MBS-REP message | |
| E-MBS Zone ID | 7 | Indicates E-MBS Zone from which the AMS is currently receiving E-MBS data | |
| Report Mode | 2 | Indicates the AMS starts/changes/ends E-MBS 0b00: AMS requests ABS to assign a carrier switching start time 0b01: AMS updates E-MBS connection Bitmap 0b10: AMS ends E-MBS carrier switching 0b11: reserved | |
| E-MBS Connection Bitmap | 16 | Each bit of the bitmap represents an E-MBS connection for which service flows have been established using AAI-DSx transactions in one E-MBS Zone. The E-MBS service(s) are mapped in ascending order of their E-MBS ID + FID value from LSB to MSB of the bitmap. For each bit: Value 0: The AMS does not intend to receive the E-MBS service. Value 1: The AMS currently receives E-MBS or the AMS may switch to this service in the near future. | Shall be included if the value of Report Mode is 0b01. |

With reference to above table, the E-MBS connection bitmap may include, for example, 16 bits and may be included when a report mode is 0b01. Each bit of the E-MBS connection bitmap represents an E-MBS connection for which service flows have been established by using DSA, DSC, and DSD transactions in one E-MBS zone. The E-MBS services are mapped in ascending order of their E-MBS ID and FID value from LSB to MSB of the bitmap. When each bit is 0, the MS does not receive the E-MBS service, and when each bit is 1, the MS receives the E-MBS or switches to the E-MBS service in the near future.

Upon receiving the switching request message through the uplink control channel, or the like, the BS responds by a switching response message. At this time, the BS transmits the switching response message so that carrier switching may be performed in units of the E-MBS service (or content) with reference to the E-MBS service (or contents) currently received by the MS or the E-MBS service (or content) desired to be received by the MS through the switching request message. In particular, the MBS MAP defining the E-MBS service (or content) may inform about a point in time at which the corresponding E-MBS service (or content) is to be received, a period, and a point in time at which the carrier is to be switched to the primary carrier, and the like. The switching response message may be also called an E-MBS response message (E-MBS-RSP message).

The following table shows an example of the switching response message.

| Attributes/Array of attributes | Size (bits) | Value/Notes | Conditions |
|---|---|---|---|
| MAC Control Message Type | 8 | AAI E-MBS-RSP message | |
| Carrier Switching Start time | 4 | 4 LSBs of superframe number at which the AMS switches carrier to receive E-MBS | Present when the report mode in AAI E-MBS-REP message is 0b00 |
| Unicast Available Interval Bitmap | Variable | Indicates when the AMS should be available in the primary carrier using N bits $b_0 b_1 b_2 \ldots b_{N-1}$<br>If $b_i == 0$, then AMS is available for E-MBS data scheduling in secondary carrier<br>If $b_i == 1$, then AMS is available for unicast scheduling in primary carrier<br>$N_{MSI}$ = 2 superframes: N = 4 bits<br>$N_{MSI}$ = 4 superframes: N = 4 bits<br>$N_{MSI}$ = 8 superframes: N = 8 bits<br>$N_{MSI}$ = 16 superframes: N = 16 bits<br>Depending on the $N_{MSI}$, the number of bits per subframe changes<br>If $N_{MSI}$ = 2, then 2 frames per bit<br>If $N_{MSI}$ = 4, 8 and 16, then 4 frames per bit | Present when the report mode in AAI E-MBS-REP message is 0b01 |

With reference to the above table, the switching response message includes a unicast available interval bitmap. The unicast available interval bitmap indicates whether or not the MS is available in the primary carrier by using an N-bit bitmap. Namely, the unicast available interval bitmap indicates whether or not the MS can receive a control signal or the like through the primary carrier. For example, when each bit of the unicast available interval bitmap is 0, the MS may perform E-MBS data scheduling in the secondary carrier, and when each bit of the unicast available interval bitmap is 1, the MS may perform E-MBS data scheduling in the primary carrier. The size of the unicast available interval bitmap may vary according to the number of superframes of the MSI.

The MS receives the switching response message, switches from the secondary carrier to the primary carrier at the switching start time, and then receives data from the BS through the primary carrier, starting from the switching start time. After the switching interval during which the MS stays in the switched carrier, the MS may switch to the secondary carrier back from the primary carrier.

Meanwhile, the switching interval may be set by an MSI period or a transmission period of the MBS MAP.

Figure 5:
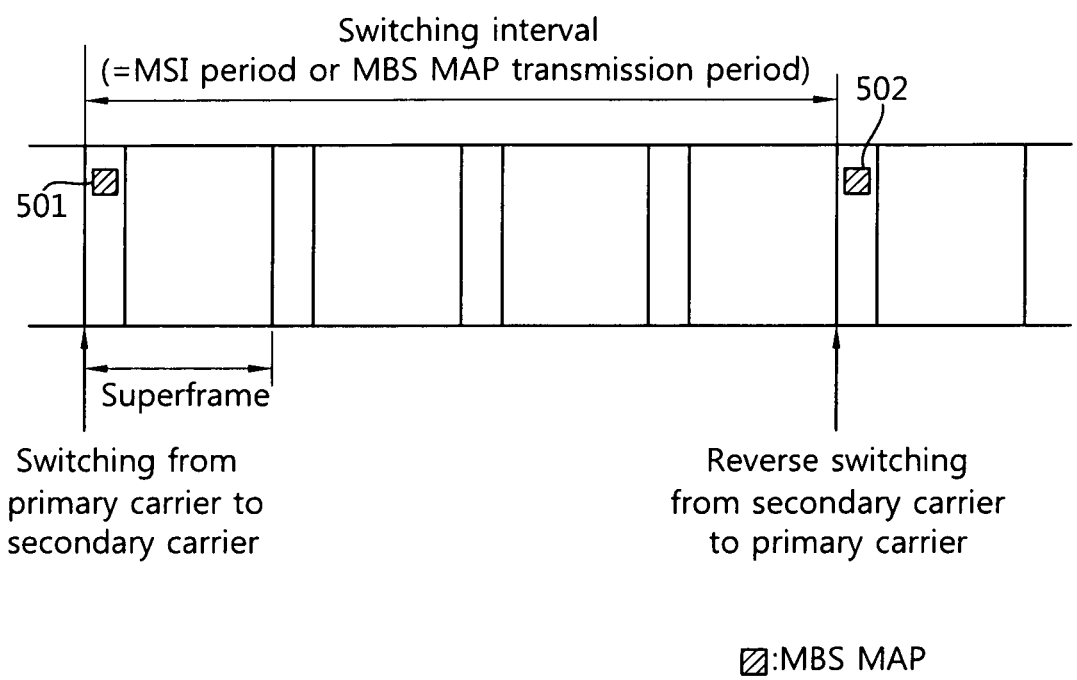
FIG. 5 shows an example of a switching interval according to an exemplary embodiment of the present invention.

FIG. 5 shows an example of a switching interval according to an exemplary embodiment of the present invention. The switching interval includes four superframes. The MBS MAP 501 is transmitted in the first superframe, and an MBS MAP 502 is transmitted in a fifth superframe. In this case, reverse switching is not performed in the second superframe but performed in the fifth superframe in which the MBS MAP is transmitted. Namely, the switching interval corresponds to four superframes, a transmission period of the MBS MAP. However, the switching interval corresponding to the four superframes is merely an example. Namely, the switching interval may be longer or shorter.

In terms of the characteristics of the E-MBS service, in most cases, one BS performs several services on the MS, and the BS largely transmits signals and the MS receives them. The MS merely transmits a control signal to the BS, occasionally. Thus, if switching is performed at every superframe in spite of the fact that the MS receives signals from the BS in most cases, a service delay would occur and QoS would not be satisfied.

In case of providing the E-MBS service, because each MSI has its own unique pattern, it would be more effective to perform carrier switching at the MSI period comprised of one or more superframes, instead of a superframe unit or at the transmission period of the MBS MAP and QoS problem can be solved. However, FIG. 5 merely shows an example of the present invention, and the MSI period and the transmission period of the MBS MAP may differ, and accordingly, the switching interval may vary.

The switching start time or the reverse switching start time may be advanced or deferred. Also, as the switching start time and the reverse switching start time change, the switching period may be also prolonged (extended) or shortened. In case of the E-MBS service, it has a certain pattern by MSI, and such pattern is largely made by superframe. When the E-MBS service has a fixed pattern, it is advantageous, but not when the patterns are diverse.

Figure 6:
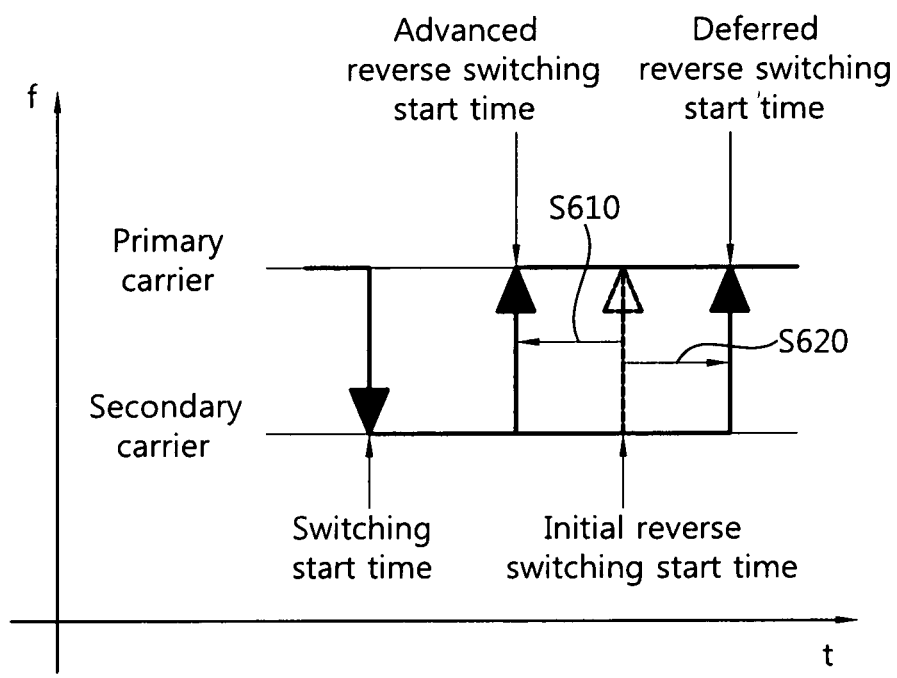
FIG. 6 shows reverse switching start time advanced or deferred from the initial start time according to an exemplary embodiment of the present invention.

FIG. 6 shows reverse switching start time advanced or deferred from the initial start time according to an exemplary embodiment of the present invention.

With reference to FIG. 6, when the MS reversely switches from the secondary carrier to the primary carrier, data transmission may be delayed or additional data may need to be transmitted. Then, the period during which signals are transmitted through the secondary carrier needs to be extended, and in this situation, the solution may be that the reverse switching start time is deferred (S610). Conversely, although the MS is in the switching interval, the MS may need to immediately reversely switch to the primary carrier for a transmission of uplink data, and in this situation, the solution may be that the reverse switching start time is advanced (S620).

Figure 7:
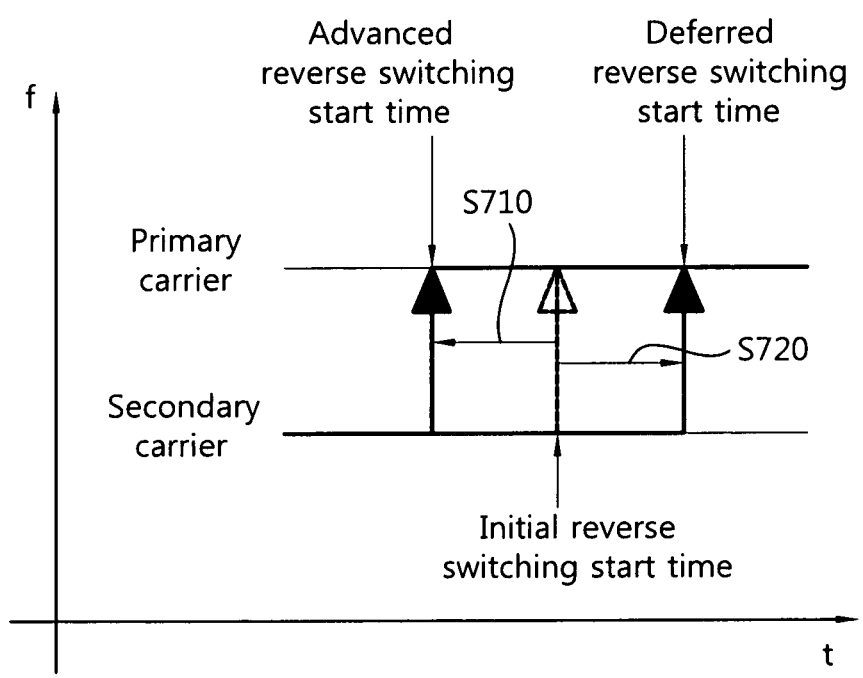
FIG. 7 shows advancing or deferring a switching start time according to an exemplary embodiment of the present invention.

FIG. 7 shows advancing or deferring a switching start time according to an exemplary embodiment of the present invention.

With reference to FIG. 7, a situation in which switching is not desired or a change time is intended to be advanced or deferred may occur. When the MS switches from the secondary carrier to the primary carrier, the switching start time may be flexibly adjusted such that it is advanced (S710) or deferred (S720). This may be an effective measure when control information needs to be immediately transmitted through the primary carrier or when a data transmission is delayed.

A method for providing information regarding a switching start time and a switching interval will now be described.

Figure 8:
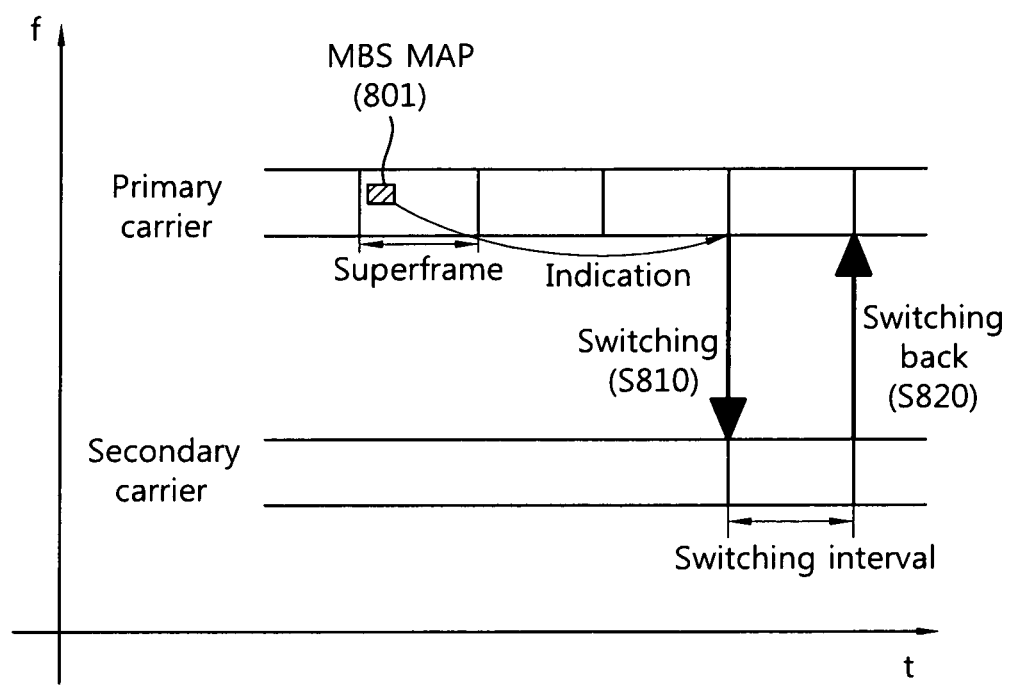
FIG. 8 shows an example of providing switching information through an MBS MAP by the BS.

FIG. 8 shows an example of providing switching information through an MBS MAP by the BS. The MBS MAP 801 indicates a superframe following two superframes as a switching start point. The MS switches from the primary carrier to the secondary carrier (S810), stays in the secondary carrier during the switching interval indicated by the MBS MAP, and then reversely switches to the primary carrier (S820). Here, determining the superframe after the two superframes as a switching start time is merely an example, and the switching start time and the switching interval may vary. The switching start time may be an offset value from a superframe including the MBS MAP or may be the number of a superframe. Alternatively, the switching start time may be a start time of an MBS area of a data area of the superframe including the MBS MAP.

Figure 9:
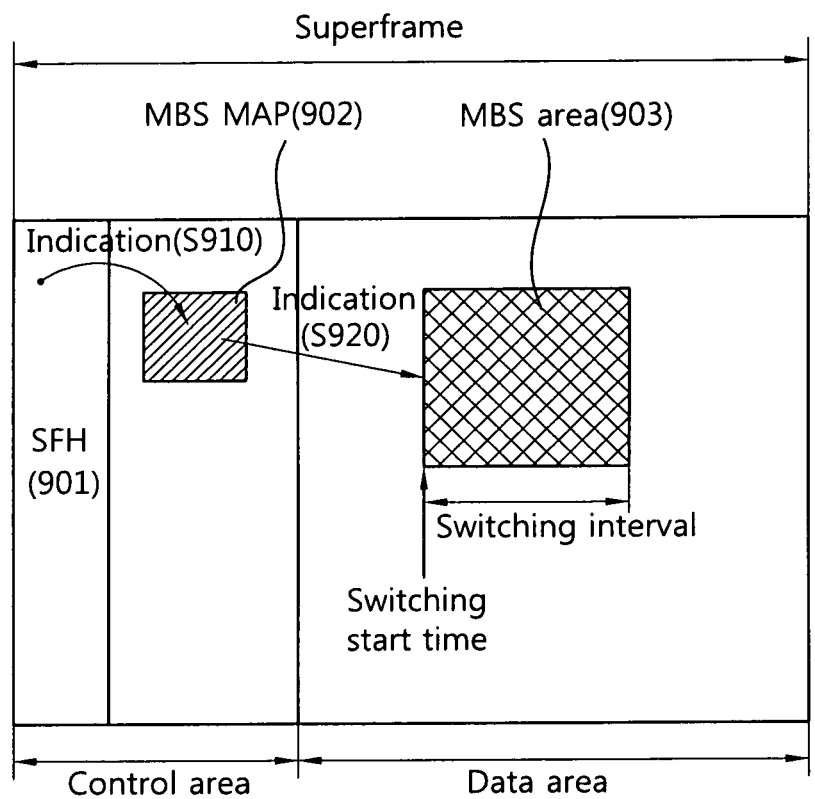
FIG. 9 shows an example of providing switching information through the MBS MAP in a superframe.

FIG. 9 shows an example of providing switching information through the MBS MAP in a superframe. SFH 901 indicates a MBS MAP 902 (S910) and indicates a switching start time and a switching interval an MBS area 903 of a data area through the MBS MAP 902 (S920). After the MS performs switching at the switching start time, the MS transmits data during the switching interval.

When control information such as the switching start time, and the like, is included in the MBS MAP of the primary carrier, the MS may recognize the MBS area indicated by the MBS MAP and switch to the secondary carrier at one point of the MBS area as a switching start time. In this case, the switching interval may be a period from the switching start time to a point at which the MBS area ends. When the switching interval is terminated, the MS may switch back from the secondary carrier to the primary carrier.

The MBS MAP may include information regarding a next switching start time and a next switching interval as well as the current switching start time and the current switching interval.

Figure 10:
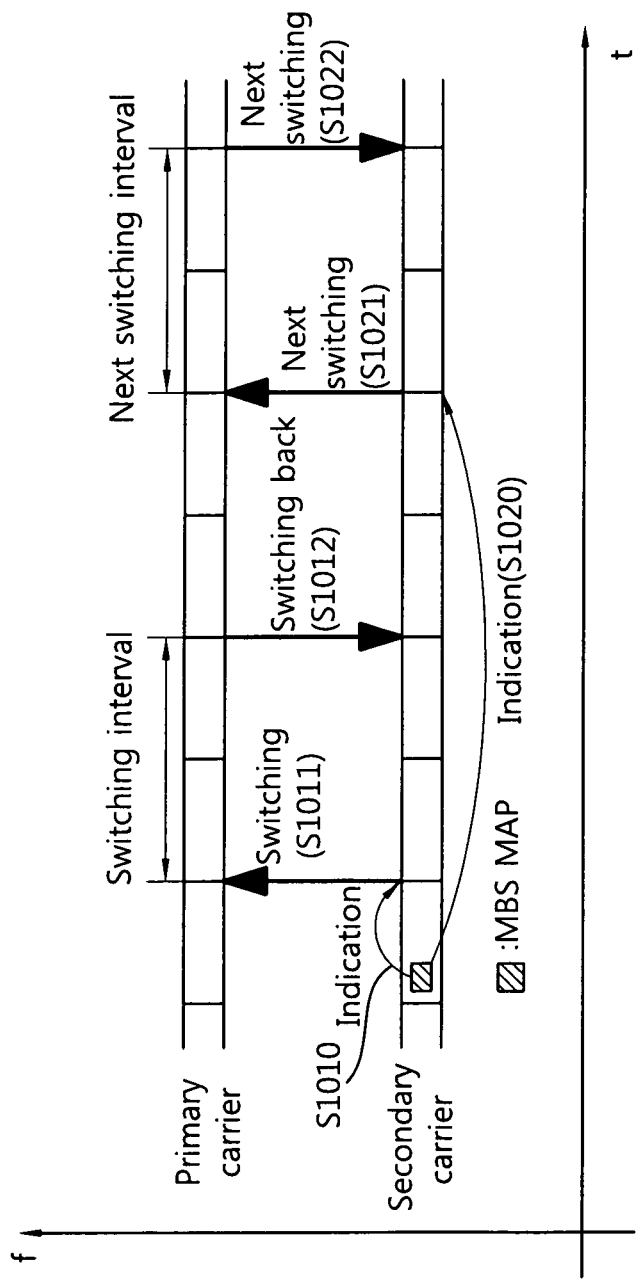
FIG. 10 shows an example of an MBS MAP including a plurality of switching information.

FIG. 10 shows an example of an MBS MAP including a plurality of switching information. First switching (S1011) and reverse switching (S1012) may be performed according to an indication of the MBS MAP (S1010). When the MBS MAP includes information regarding a next switching start time and next switching interval, when the first switching is terminated, the MS may perform second switching from the secondary carrier to the primary carrier, starting from the next switching start time, during the next switching interval according to the indication (S1020) of the MBS MAP (S1021), and transmit or receive data during the interval in a state of being switched to the primary carrier. And then, after the next switching interval is terminated, the MS may switch back (S1022).

Meanwhile, switching may be performed not only by the MBS MAP but also by content. Also, in this case, an MBS MAP defining content may inform about a point in time at which corresponding content is to be received, period, a start time for switching back a carrier to the primary carrier, and the like.

The switching start time, the switching interval, and the point in time at which the MS switches back from the secondary carrier to the primary carrier may be informed by one or more combinations of a multi-carrier-related message, a different MBS MAP, a subheader, an existing MAC management message, a new MAC management message, and a control channel.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method for transmitting data by a base station (BS) in a multicast broadcast service (MBS) supporting multiple carriers in a wireless communication system, the method comprising:

receiving a switching request message indicating an enhanced multicast broadcast service (E-MBS service) requested by a mobile station (MS), from the MS;

transmitting a switching response message including information regarding a switching start time among a plurality of carriers set in the MS; and transmitting data regarding an E-MBS service requested by the MS to the MS through a primary carrier, starting from the switching start time, wherein the switching response message comprises a unicast available interval bitmap indicating whether or not performing unicast scheduling to the MS in a primary carrier is available after the MS switches to the primary carrier.

2. The method of claim 1, wherein the switching request message comprises an E-MBS connection bitmap, and each bit of the E-MBS connection bitmap is exclusively mapped to each of a plurality of E-MBS services for which the MS is to switch.

3. The method of claim 1, wherein the switching start time is advanced or deferred.

4. The method of claim 1, wherein the switching request message or the switching response message further comprises a switching interval during which a switched state continues, and the switching interval is prolonged or shortened.

5. The method of claim 1, wherein the switching response message is included in an MBS MAP.

6. The Method of claim 5, wherein the switching start time is a point of an MBS region of the MBS MAP, and the switching start time is determined by the BS.

7. The method of claim 6, further comprising:

reversely switching from the primary carrier to a secondary carrier at a point in time when the switching interval is terminated.

8. The method of claim 7, further comprising:

when the MBS MAP comprises information regarding a next switching start time and a next switching interval, switching again from the second carrier to the first carrier at the next switching start time with reference to the information; and receiving, by the MS, data from the BS through the primary carrier during the next switching interval.

9. The method of claim 5, wherein the switching start time is a point at which a transmission is stopped in the MBS region indicated by the MBS MAP of the secondary carrier, and further comprising:

when the MBS MAP indicates a next MBS MAP, switching from the secondary carrier to the primary carrier at a point in time when the next MBS MAP starts.

10. The method of claim 5, further comprising:
when the MBS MAP further comprises the information regarding a next switching start time and a next switching interval, switching from the secondary carrier to the primary carrier at the next switching start time with reference to the information; and
receiving, by the MS, data from the BS through the primary carrier during the next switching interval.

11. The method of claim 1, wherein the switching request message is transmitted when the MS requests a point in time at which the MS is to switch to a carrier from the BS after a DSA, DSC or DSD transaction, when the MS updates an indication regarding an E-MBS stream currently received by the MS without releasing an E-MBS connection allocated through a DSA-REQ or DSA-RSP message, or when the MS indicates a time at which E-MBS carrier switching is to be stopped without releasing an E-MBS connection allocated through the DSA-REQ or the DSA-RSP message.

12. A method for receiving data by a mobile station (MS) in a multicast broadcast service (MBS) supporting multiple carriers in a wireless communication system, the method comprising:
transmitting a switching request message indicating an enhanced multicast broadcast service (E-MBS service) requested by the MS to a BS;
receiving a switching response message including information regarding a switching start time among a plurality of carriers set in the MS from the BS;
switching from a secondary carrier to a primary carrier at the switching start time; and
receiving data regarding an E-MBS service requested by the MS from the BS through the primary carrier,
wherein the switching response message comprises a unicast available interval bitmap indicating whether or not performing unicast scheduling to the MS in a primary carrier is available after the MS switches to the primary carrier.

13. The method of claim 12, wherein the switching request message comprises an E-MBS connection bitmap, and each bit of the E-MBS connection bitmap is exclusively mapped to each of a plurality of E-MBS services for which the MS is to switch.

* * * * *